United States Patent [19]

Perbet et al.

[11] Patent Number: 4,732,873
[45] Date of Patent: Mar. 22, 1988

[54] METHOD OF FABRICATION OF NON-LINEAR CONTROL ELEMENTS FOR A FLAT ELECTROOPTICAL DISPLAY SCREEN

[75] Inventors: Jean N. Perbet, Gif sur Yvette; Bruno Mourey, Boulogne Billancourt; Michel Graciet, Villeron sur Yvette; Michel DeFrance, La Ville du Bois; Patrick Truffer, Les Ulis; Nicolas Szylo, Limours, all of France

[73] Assignee: Thomson-CSF, Paris, France

[21] Appl. No.: 846,276

[22] Filed: Mar. 31, 1986

[30] Foreign Application Priority Data

Apr. 2, 1985 [FR] France .................. 85 05007

[51] Int. Cl.⁴ ............................................. H01L 21/20
[52] U.S. Cl. .................................. 437/101; 437/225; 437/245; 437/15; 437/904; 357/15; 357/58; 357/59
[58] Field of Search .................... 340/718, 719, 784; 307/298; 357/2; 29/572, 591, 571; 148/DIG. 1; 350/333; 437/101, 904

[56] References Cited

U.S. PATENT DOCUMENTS

| | | | |
|---|---|---|---|
| 4,163,677 | 8/1979 | Carlson et al. | 357/2 |
| 4,223,308 | 9/1980 | Baraff | 340/784 |
| 4,242,156 | 12/1980 | Peel | 156/653 |
| 4,281,208 | 7/1981 | Kuwano et al. | 29/572 |
| 4,368,085 | 1/1983 | Peel | 29/571 |
| 4,409,424 | 10/1983 | Devaud | 357/2 |
| 4,523,811 | 1/1985 | Ota | 350/333 |
| 4,653,858 | 3/1987 | Szydlo et al. | 156/657 |

FOREIGN PATENT DOCUMENTS 0090661 5/1983 European Pat. Off. .
2144266 2/1985 United Kingdom .
2146827 4/1985 United Kingdom .

OTHER PUBLICATIONS

*Appl. Phys. Lett.* 44(2) Jan. 15, 1984, pp. 205–206 "New Amorphous Silicon Nonlinear Element for Liquid Crystal Display Addressing" by N. Szydlo et al.
Translation of French Patent No. 2518788, Nicolas Szydlo et al.
*Appl. Phys Letter* 53(7) Jul. 1982, pp. 5044–5051 "Post-Hydrogenated Chemical Vapor Deposited Amorphous Silicon Schotthy Diodes", N. Szydlo et al.
*Appl. Phys* (24) 1981 "Application of Amorphous Silicon Field Effect Transistor in Addressable Liquid Crystal Display Panels", A. J. Snell et al.
"VLSi Fabrication Principles", John Wiley & Sons, by S. K. Grandhi, p. 514, and pp. 556–560.

*Primary Examiner*—Brian E. Hearn
*Assistant Examiner*—Kevin McAndrews
*Attorney, Agent, or Firm*—Oblon, Fisher, Spivak, McClelland & Maier

[57] ABSTRACT

In a method of fabrication of non-linear control elements for a flat display screen of the liquid crystal type, successive layers of $n^{30}$ doped amorphous semiconductor, of undoped amorphous semiconductor and of metal are deposited on a substrate, whereupon the control elements are formed by masking and etching. The flanks of the control elements are then isolated, whereupon the electrodes and control leads are formed by deposition and etching.

3 Claims, 12 Drawing Figures

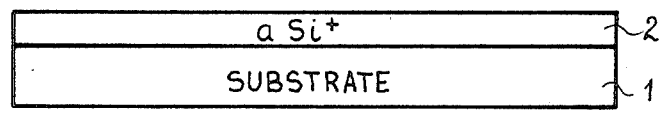
FIG_1
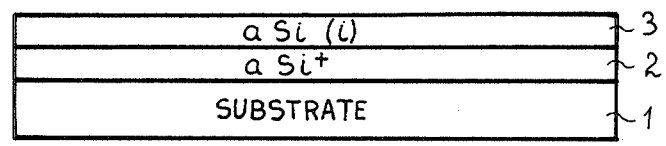
FIG_2
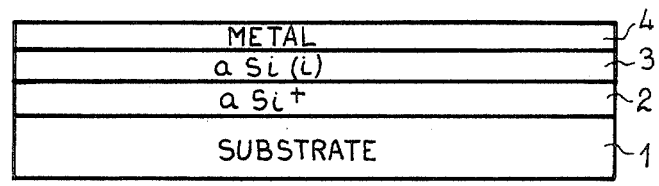
FIG_3
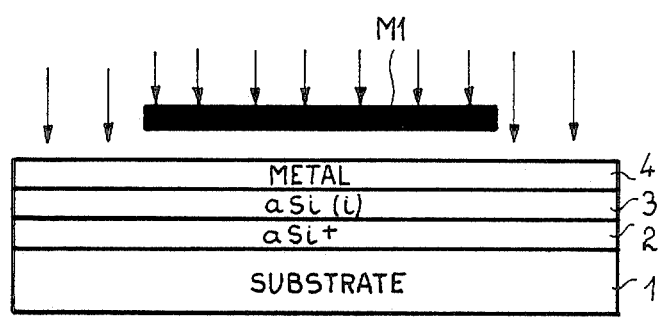
FIG_4
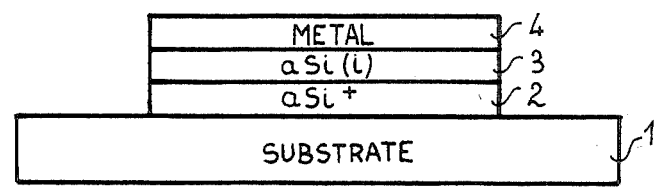
FIG_5

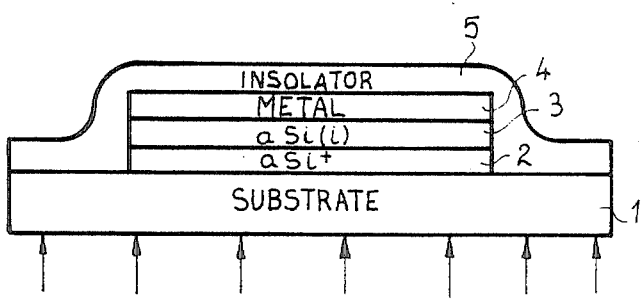
FIG_6
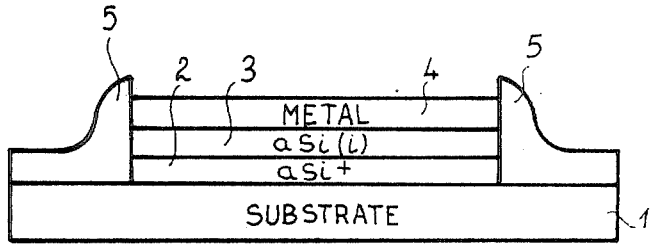
FIG_7
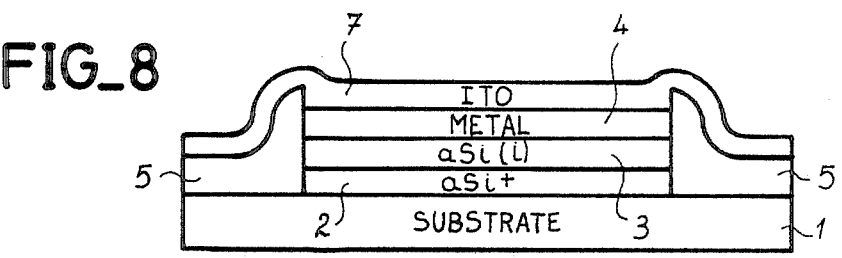
FIG_8
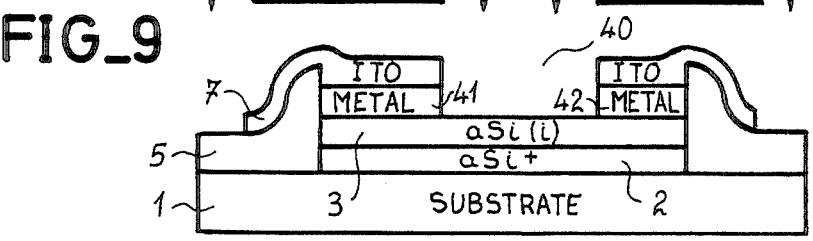
FIG_9

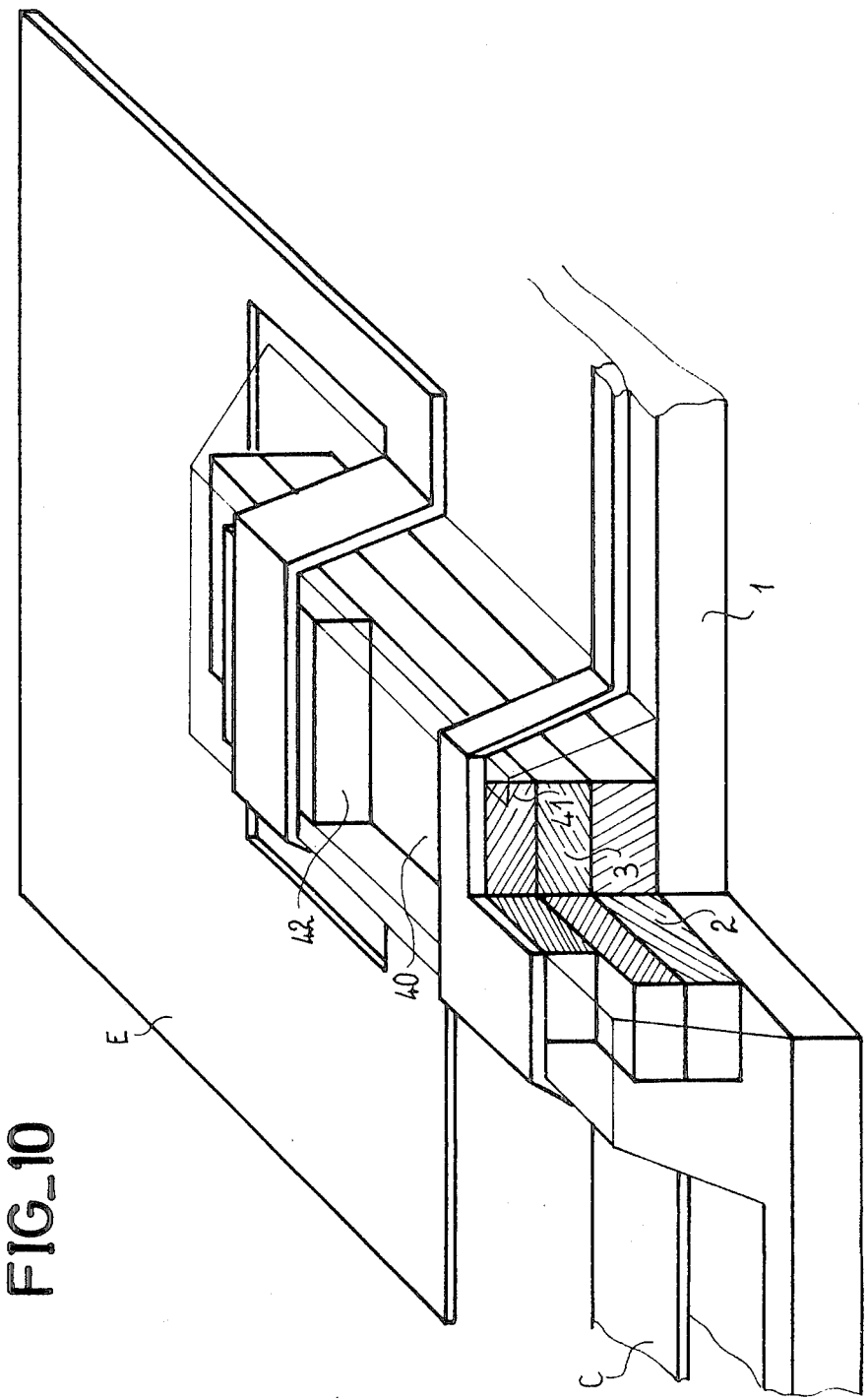
FIG_10

FIG_11
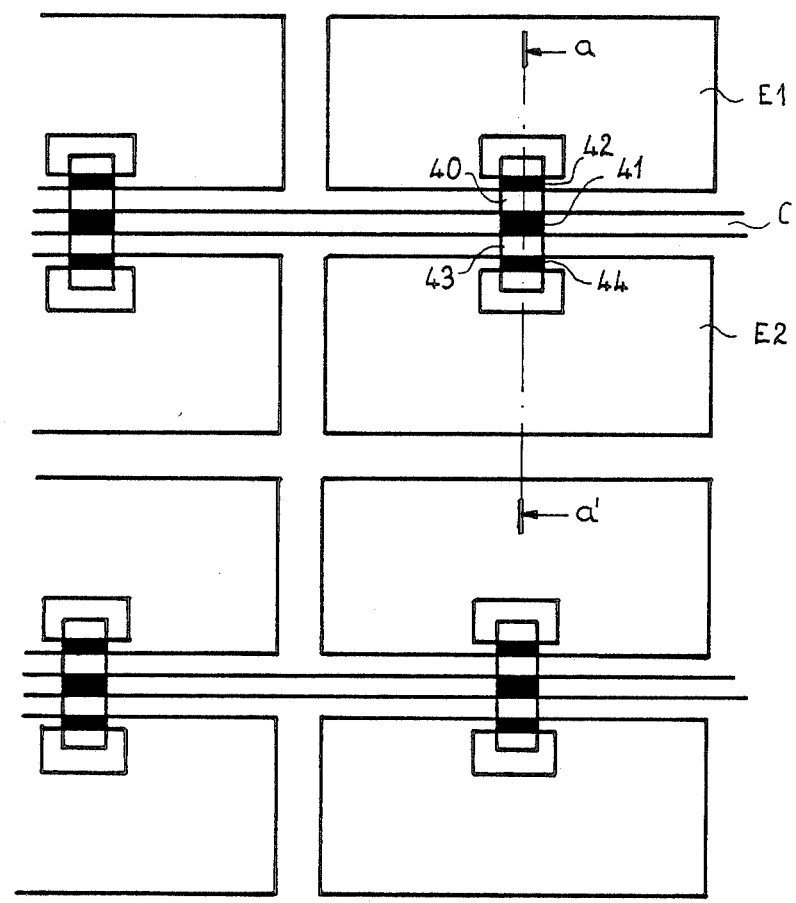
FIG_12
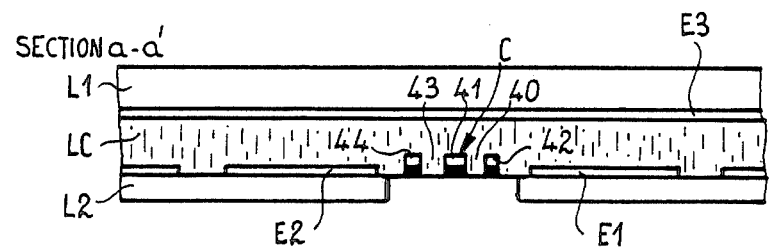

METHOD OF FABRICATION OF NON-LINEAR CONTROL ELEMENTS FOR A FLAT ELECTROOPTICAL DISPLAY SCREEN

BACKGROUND OF THE INVENTION

1. Field of the Invention

This invention relates to a method of fabrication of non-linear control elements for a flat display screen, especially for a liquid-crystal display screen, and also to a flat screen fabricated in accordance with said method.

The present invention finds an application in the general field of large-area thin-film electronics and is more specifically applicable to integrated control of each elementary point of a liquid-crystal screen.

2. Description of the Prior Art

It is already known that liquid-crystal display screens usually have a large number of image points or elements of square or rectangular shape. These image elements can be addressed individually. The definition of the screen is a function of the number of points which are capable of receiving an item of information. Control of each point is performed by application of an electric field. For the purpose of visualizing video information, it has been proposed to provide matrix-type displays in which each image element is defined by the intersection of two orthogonal arrays of leads designated as rows and columns.

Addressing of an image element by means of control voltages applied to the row and to the column which relate to said element does not need to be maintained in the event of adoption of a time-multiplexing technique which permits refreshment of the state of the screen by recurrence. This technique is based on a persistence effect which may be either physiological or available within the screen element. In the case of liquid-crystal display devices, an image element can be assimilated with a capacitor in which the time constant is sufficient to maintain the charge between two successive transient addressing operations.

In the present invention, a non-linear resistor is placed in series with the image element and is practically insulating at values below a threshold voltage but becomes increasingly conductive above said threshold voltage.

A non-linear element of this type can be of varistor material as described in French patent Application No. 81 16217 filed on Aug. 25, 1981 in the name of the present Applicant and published under No. 2,512,240.

In the field of display screens, current technical requirements are primarily centered on the achievement of higher image definition. In the case of screens of the matrix display type, it is accordingly found necessary to design devices comprising a large number of addressing rows or columns which can amount to as many as 512 or even 1024. This entails a corresponding increase in the number of switching elements and therefore of varistors. For the purposes of large-scale production, it is necessary in particular to obtain good reproducibility and high stability of these components. Moreover, the electrical capacitance of the component must be matched with that of the associated cell, also with good reproducibility. In point of fact, however, these requirements cannot be fully satisfied by the materials commonly employed, such as agglomerates of zinc oxide powder containing particles of bismuth oxide and manganese oxide or similar material. The reproducibility and stability of varistors depend among other things on the grain size and on the techniques of passivation of the grain boundaries employed at the time of fabrication. The stray capacitance of the varistor which is also related to the grain boundaries cannot readily be controlled.

Other switching elements can be employed. Nevertheless, liquid-crystal display screens usually exhibit defective uniformity of contrast according to the image elements considered. Such defects are due to dispersion of the characteristics of the switching elements, which may be substantial and is difficult to eliminate on large areas. Although to a lesser extent, such defects may also arise from the thickness of the liquid crystal layer and from its bonding layer.

In order to overcome these disadvantages, devices are known in which the non-linear elements are thin-film transistors which mainly have a base of amorphous silicon or polycrystalline silicon. However, a certain number of difficulties are encountered in this type of technology and therefore have to be overcome if high-quality addressing is to be achieved. The solutions to be found must accordingly take into account the following considerations:

(1) better control of characteristics which depend on the properties of two layers (silicon and insulator) and of their interface;

(2) a self-alignment technology is necessary in order to achieve better reproducibility over a large area.

Other solutions contemplate the use of nonlinear elements consisting of dipole elements such as the structure having a base of two diodes mounted in series and in opposition.

These diodes are semiconductor diodes which all have the same operating point in the current-voltage characteristic. Devices of this type are described in French patent No. 83 14542 filed on Sept. 13, 1983 by the present Applicant and are designed in particular in the form of Schottky diodes.

However, the practical application of this solution usually entails the need for at least four masking levels.

The present invention relates to a method for reducing to two the number of masking operations which, in addition, do not call for a high standard of accuracy.

SUMMARY OF THE INVENTION

The invention therefore relates to a method of fabrication of non-linear control elements for an electrooptical display screen comprising electrooptical material placed between a first and a second plate, the method being distinguished by the fact that it consists in performing the following successive steps on the second plate (1):

(a) a first step involving deposition of a layer of n+ doped amorphous semiconductor material;

(b) a second step involving deposition of undoped amorphous semiconductor material;

(c) a third step involving deposition of a layer of metallic material;

(d) a fourth step which involves masking of the control elements to be formed;

(e) a fifth step which involves etching of the three unmasked layers mentioned above so as to form mesa structures;

(f) a sixth step involving deposition of a layer of insulating material;

(g) a seventh step which involves etching of the layer of insulating material located at the surface of the layer of metallic material;

(h) an eighth step involving deposition of a layer of conductive material;

(i) and a ninth step which involves etching on the one hand of the layer of conductive material in order to define display screen electrodes and control leads such that the electrodes are coupled with control leads by means of control elements thus formed, and on the other hand of the layer of metallic material in order to form two metallic control-element gates on each control element.

The invention further relates to a flat electrooptical display screen comprising first and second parallel plates, electrooptical material being sandwiched between said plates. Each plate is provided with electrodes and a control lead on that face which is in contact with the electrooptical material, said electrodes and control leads being coupled to each other by means of non-linear control elements. The distinctive feature of the invention lies in the fact that the control elements are formed in accordance with said method and each comprise two diodes in series and in opposition constituted in turn by an n+ doped amorphous semiconductor layer, an undoped amorphous semiconductor layer and a metallic layer.

BRIEF DESCRIPTION OF THE DRAWINGS

Other features of the invention will be more apparent upon consideration of the following description and accompanying drawings, wherein:

FIGS. 1 to 9 illustrate one example of execution of the method in accordance with the invention;

FIG. 10 is a perspective view of a control element constructed by means of the method in accordance with the invention;

FIG. 11 is a general view of a control matrix constructed in accordance with the invention;

FIG. 12 is a sectional view of the control matrix shown in FIG. 11.

DESCRIPTION OF THE PREFERRED EMBODIMENTS

One example of execution of the method in accordance with the invention will now be described with reference to FIGS. 1 to 9.

During a first step of the method, a layer 2 of n+ doped amorphous silicon is deposited on a substrate 1 of transparent insulating material either by plasma-assisted deposition by the so-called glow-discharge process at a temperature of approximately 250° C. or by vapor-phase epitaxy generally known as chemical vapor deposition (CVD) at approximately 600° C. or else by low-pressure pressure vapor-phase epitaxy known as low-pressure chemical vapor deposition (LPCVD) at approximately 550° C. The thickness of the layer 2 thus formed must be within the range of 300 to 1000 Angströms. A structure as shown in FIG. 1 is thus obtained.

During a second step, a layer 3 of undoped amorphous silicon is deposited. The method of deposition employed can be one of the three methods mentioned above. In the case of deposition by epitaxy (CVD or LPCVD), it will prove advisable to provide a post-hydrogenation process in order to passivate dangling bond defects or in other words to fill all the broken bonds.

The thickness of the undoped amorphous silicon layer 3 must be within the range of 2000 to 6000 Angströms. The component thus obtained has the structure shown in FIG. 2.

During a third step, deposition of a metal layer 4 such as platinum, molybdenum or palladium is performed by vacuum evaporation or cathode sputtering. Said metal layer must have a thickness of a few hundred Angströöms.

During a fourth step, a mesa structure is formed by photolithography in the three layers 2, 3 and 4 deposited earlier. To this end and as shown in FIG. 4, the region corresponding to the mesa structure to be formed is shielded by means of a mask M1. The layers 2, 3 and 4 are then attacked by dry etching process (plasma etching) or by chemical etching process in the unmasked region. The structure thus obtained is shown in FIG. 5.

During a fifth step, there is deposited a layer 5 of negative photosensitive resin such as a layer of photosensitive polyimide which has the property of dissolving in the unexposed regions at the time of development after exposure.

During a sixth step, a light source (not shown) is employed for the purpose of exposing the resin layer 5 through the substrate 1 as indicated by the arrows in FIG. 6. The metal of the layer 4 forms a screen for the resin previously deposited on said metal layer 4 and performs the function of a photoetching mask. This resin is therefore not exposed and is dissolved after development. The part thus obtained is shown in FIG. 7.

During a seventh step, annealing of the insulator layer is carried out with a view to producing solidification of this latter. The annealing temperature depends on the exact nature of the insulator, which is known in the technique considered.

During an eighth step (shown in FIG. 8), there is deposited a layer 7 of conductive material which can consist of transparent material if the control element is employed in a display screen which operates in the transmission mode. It will thus be possible to deposit a mixed oxide layer of indium-tin oxide (ITO) or equivalent material ($In_2O_3$, $SnO_2$) A layer of this type will have a thickness of 100 to 2000 Angströms.

During a ninth step as shown in FIG. 9, surface areas of the layer 7 of conductive material are shielded by means of masks M2 and M3 and the layer 7 is then subjected to an etching operation.

Positioning of the masks M2 and M3 is such that the etching process has the effect of splitting the layer 7 into two parts. Furthermore, the etching process serves to remove material from the metal layer 4 and thus to obtain in a similar manner two separate and distinct metallic regions 41 and 42, a space 40 being thus freed between said regions.

Moreover, the shapes of the masks M1 and M2 are such as to form electrodes E and control leads C at the surface of the substrate 1 as illustrated in FIG. 10. It is apparent from this figure that a control lead C is coupled with an electrode E by means of an element as formed earlier and comprising successively a metal layer 41, an undoped amorphous silicon layer 3, an n+ doped amorphous silicon layer, again another undoped amorphous silicon layer 3, and a metal layer 42. A control element as thus described constitutes two Schottky diodes mounted in series and in opposition.

The method of fabrication in accordance with the invention and as described in the foregoing permits collective formation on a wafer substrate of an array of electrodes E, of control leads C and of control elements for coupling each electrode E with a control lead C.

In FIG. 11, a control lead C serves to control two electrodes E1 and E2 via a control element, the structure of which has been duplicated with respect to the structure of FIG. 10. The electrode E1 is coupled with the lead C by means of two diodes mounted in series and in opposition between the metal layers 41 and 42. The electrode E2 is coupled with the lead C by means of a structure which is symmetrical with the preceding.

In FIG. 12, there is shown a liquid-crystal cell comprising a liquid crystal LC sandwiched between two parallel plates L1 and L2. The plate L1 carries electrodes E3. The plate 12 carries a lead C coupled with two electrodes E1 and E2 by means of an element constituted by two diodes mounted in series and in opposition between the metal layers 41 and 44.

In accordance with an alternative embodiment of the method in accordance with the invention, the third and fourth steps for the formation of mesa structures in the layers 2, 3 and 4 can be performed differently. They can in fact be replaced by the following series of operations : resin deposition, masking, deposition of metal and removal of metal by removal of the resin. This procedure permits the use of metals which do not readily lend themselves to direct etching, the metal being employed after etching to perform the function of an etch mask for the mesa structure of the silicon layers.

In another alternative embodiment of the invention and during the fifth step, there is deposited an inorganic insulator such as $SiO_2$ or $Si_3N_4$. During the sixth step, there is accordingly performed an anisotropic plasma etch or so-called reactive-ion etching (RIE) process which allows the insulator to remain only on the flanks of the mesa structure.

It is therefore apparent that the method in accordance with the invention provides for only two masking operations which do not require a high degree of accuracy. This method is therefore well-suited to the fabrication of redundant structures and in particular to a structure of the type described with reference to FIGS. 11 and 12.

What is claimed is:

1. A method of fabrication of non-linear control elements for an electrooptical display screen comprising electrooptical material placed between a first and a second plate, comprising the following successive steps performed on the second plate:
    (a) a first step involving deposition of a layer of n+ doped amorphous semiconductor material;
    (b) a second step involving deposition of undoped amorphous semiconductor material;
    (c) a third step involving deposition of a layer of metallic material;
    (d) a fourth step which involves masking of the control elements to be formed;
    (e) a fifth step which involves etching of the three unmasked layers mentioned above so as to form mesa structures;
    (f) a sixth step involving deposition of a layer of insulating material;
    (g) a seventh step which involves etching of the layer of insulating material located at the surface of the layer of metallic material;
    (h) an eighth step involving deposition of a layer of conductive material;
    (i) a ninth step which involves etching on the one hand of the layer of conductive material in order to define display screen electrodes and control leads such that the electrodes are coupled with control leads by means of control elements thus formed, and on the other hand of the layer of metallic material in order to form two metallic control-element gates on each control element.

2. A method of fabrication according to claim 1 wherein at least the second plate is transparent, and wherein the layer of insulating material is a negative resin and wherein the seventh step in the process of formation of said layer of insulating material primarily consists of exposure to a light beam directed through said second plate in such a manner as to ensure that the insulating material located at the surface of the layer of metallic material is not exposed and that this material alone is removed by washing of the layer of insulating material.

3. A method according to claim 1, wherein the material deposited during the sixth step is an inorganic insulating material and wherein the procedure involved in the seventh step consists in removing said material by reactive-ion etching except on the flanks of the mesa structures.

* * * * *